(12) United States Patent
Inoue

(10) Patent No.: US 8,540,503 B2
(45) Date of Patent: Sep. 24, 2013

(54) DISK SUBSTRATE MOLDING APPARATUS, DISK SUBSTRATE MOLDING METHOD AND DISK SUBSTRATE MOLDING DIE

(75) Inventor: Kazuo Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 117 days.

(21) Appl. No.: 13/122,030

(22) PCT Filed: Sep. 1, 2010

(86) PCT No.: PCT/JP2010/005394
§ 371 (c)(1),
(2), (4) Date: Mar. 31, 2011

(87) PCT Pub. No.: WO2011/030523
PCT Pub. Date: Mar. 17, 2011

(65) Prior Publication Data
US 2011/0204535 A1 Aug. 25, 2011

(30) Foreign Application Priority Data
Sep. 9, 2009 (JP) .................. 2009-207695

(51) Int. Cl.
*B29C 45/78* (2006.01)
(52) U.S. Cl.
USPC .......... 425/143; 425/547; 425/385; 425/470; 425/810; 264/328.16
(58) Field of Classification Search
USPC ................. 425/385, 470, 547, 542, 552, 810, 425/143; 264/328.16
See application file for complete search history.

(56) References Cited

U.S. PATENT DOCUMENTS

| | | | | |
|---|---|---|---|---|
| 3,941,547 A * | 3/1976 | Hunyar et al. | ................. | 425/407 |
| 4,409,169 A * | 10/1983 | Bartholdsten et al. | ........ | 264/107 |
| 4,917,833 A * | 4/1990 | Cools | ............................ | 264/1.33 |
| 5,476,700 A * | 12/1995 | Asai et al. | .................... | 428/66.6 |
| 6,095,786 A * | 8/2000 | Inoue et al. | .................... | 425/190 |

(Continued)

FOREIGN PATENT DOCUMENTS

EP 2159033 A1 * 3/2010
JP 05212765 A * 8/1993

(Continued)

OTHER PUBLICATIONS

International Search Report issued Nov. 16, 2010 in International (PCT) Application No. PCT/JP2010/005394.

*Primary Examiner* — Dimple Bodawala
(74) *Attorney, Agent, or Firm* — Wenderoth, Lind & Ponack, L.L.P.

(57) ABSTRACT

A disk substrate molding apparatus has a disk substrate molding die and a temperature controller. The disk substrate molding die includes a stamper, a first die including a mirror member to which the stamper comes in contact, and a second die including a molding surface which forms a disk-shaped cavity between the molding surface and the stamper. The second die includes a protruding part which protrudes toward the stamper at an outer circumferential part of the molding surface. The temperature controller controls temperature of the second die so that the protruding part exhibits a higher temperature in comparison to a region further toward the inner circumferential side than the protruding part, and controls temperature of the first die so that a region opposite to the protruding part exhibits a lower temperature in comparison to the protruding part in the mirror member.

7 Claims, 15 Drawing Sheets

(56) References Cited

U.S. PATENT DOCUMENTS

| | | | |
|---|---|---|---|
| 6,164,952 A * | 12/2000 | Asai | 425/542 |
| 6,752,611 B2 | 6/2004 | Sandstrom et al. | |
| 7,004,747 B2 * | 2/2006 | Asai | 425/548 |
| 7,052,269 B2 * | 5/2006 | Ebina | 425/542 |
| 7,270,535 B2 * | 9/2007 | Inada et al. | 425/552 |
| 2002/0018827 A1 * | 2/2002 | Yasuda et al. | 425/552 |
| 2002/0058084 A1 | 5/2002 | Sandstrom et al. | |
| 2003/0215540 A1 * | 11/2003 | Asai | 425/547 |
| 2005/0220928 A1 * | 10/2005 | Inada et al. | 425/542 |
| 2008/0230955 A1 * | 9/2008 | Gouko et al. | 264/328.1 |
| 2009/0232930 A1 * | 9/2009 | Suzuki et al. | 425/547 |

FOREIGN PATENT DOCUMENTS

| | | | |
|---|---|---|---|
| JP | 05212767 A | * | 8/1993 |
| JP | 06208734 A | * | 7/1994 |
| JP | 9-295319 | | 11/1997 |
| JP | 9-314563 | | 12/1997 |
| JP | 11058474 A | * | 3/1999 |
| JP | 11291293 A | * | 10/1999 |
| JP | 2003-501776 | | 1/2003 |
| JP | 2005280003 A | * | 10/2005 |
| JP | 2005349766 A | * | 12/2005 |
| JP | 3848549 | | 9/2006 |
| JP | 2007-83653 | | 4/2007 |

* cited by examiner

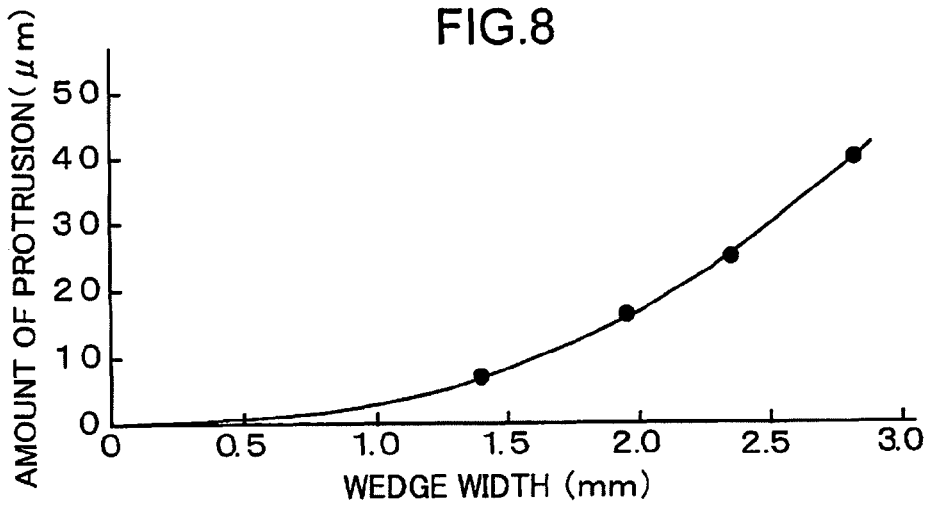
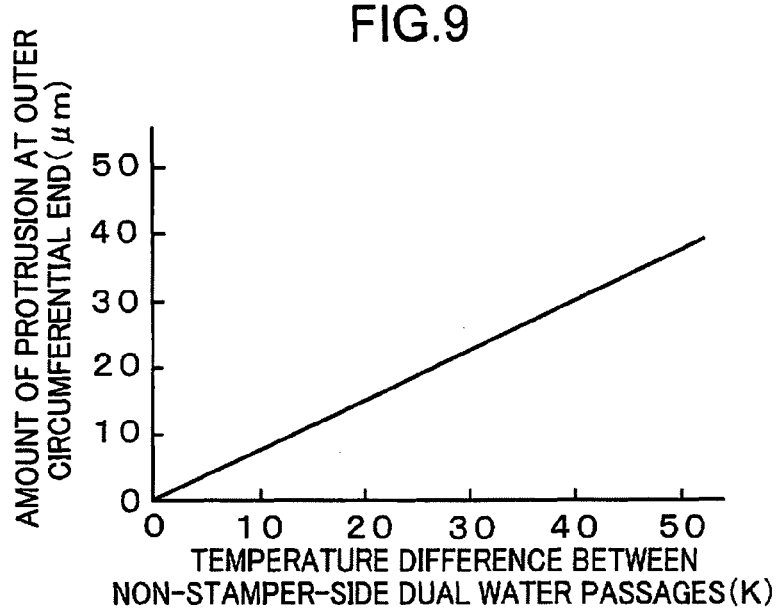

DISK SUBSTRATE MOLDING APPARATUS, DISK SUBSTRATE MOLDING METHOD AND DISK SUBSTRATE MOLDING DIE

BACKGROUND OF INVENTION

1. Technical Field

The present invention relates to a disk substrate molding apparatus, a disk substrate molding method and a disk substrate molding die.

2. Background Art

A disk-shaped optical recording medium with a substrate made of resin has been put into practical use as a large-capacity, low-cost information recording medium. For example, as this kind of optical recording medium, there are a CD (compact disk), a DVD (digital versatile disk), and a BD (Blu-ray disk). The resin substrate of this optical recording medium is manufactured with the injection molding method from the perspective of shortening the manufacturing time. With this molding method, molten resin is filled in a cavity formed within a die, and the resin is solidified and subsequently removed from the die.

FIG. 13 shows an example of a conventional die. In FIG. 13, reference numeral 101 shows a fixed-side die, and reference numeral 102 shows a movable-side die. The space created by closing the fixed-side die 101 and the movable-side die 102 is a cavity 103. The cavity 103 is where the molten resin is filled and molded into a substrate.

The fixed-side die 101 comprises a sprue bush 104 and a fixed-side mirror plate 105, and these are disposed in order from the inner circumferential side. The sprue bush 104 is a member for causing the molten resin extruded from a nozzle (not shown) of the injection molding machine to flow into the die. A water passage 106 is formed on the fixed-side mirror plate 105, and the temperature of the fixed-side mirror plate 105 is controlled by causing temperature controlled water to circulate in the water passage 106. The sprue bush 104 and the fixed-side mirror plate 106 are joined with the fixed-side plate 107. The fixed-side mirror plate 105 is fitted into the outer circumferential ring 108 and joined via a spring 109. The outer circumferential ring 108 is a member for deciding the outer circumferential end shape of the substrate.

The movable-side die 102 comprises an ejector pin 110, a cut punch 111, an ejector 112, a stamper holder 113 and a movable-side mirror plate 114, and these are disposed in order from the inner circumferential side. The cut punch 111 is a member for forming an inner hole in the molten resin that was filled in the cavity 103. The ejector pin 110 and the ejector 112 protrude from the mirror disk 114 after the molten resin is solidified. The ejector pin 110 and the ejector 112 are used for removing, from the movable-side die, the substrate part molded from the molten resin and the unneeded part in a mutually separated state. The stamper holder 113 is used for retaining the stamper 115 with the movable-side mirror plate 114. The stamper 115 is used for forming fine concavity and convexity on the substrate surface, and is generally made of nickel. The movable-side mirror plate 114 is also formed with a water passage 116 as with the fixed-side mirror plate 105. The temperature of the movable-side mirror plate 114 is controlled by causing temperature controlled water to circulate in the water passage 16. Note that, in FIG. 13, reference numeral 117 is a movable-side plate, and the movable-side mirror plate 114 is joined with the movable-side plate 117.

When molding a resin substrate with the injection molding method, even in cases where the thickness of the cavity is molded in a uniform width from the inner circumference to the outer circumference, the vicinity of the outer circumferential end of the molded resin substrate tends to become thicker than the inner circumference or the middle circumference. This phenomenon is referred to as a ski jump or an edge wedge.

FIG. 14 is a cross section of a resin substrate molded with the injection molding method, and FIG. 15 is a conceptual diagram of a resin substrate where the edge wedge of the outer circumferential part is illustrated with emphasis. Here, a resin substrate with a diameter of 120 mm and thickness of 1.2 mm is taken an as example, and the explanation is provided based on this substrate. The thickness of the resin substrate gradually increases from a position that is 3 mm inward from the outer circumferential end toward the outer circumferential end, and the increment is also increasing. Although the maximum amount of swelling of the edge wedge depends on the molding conditions and the die, it is generally within the range of 10 μm to 40 μm.

As causes of the edge wedge, for example, pressure is applied to the resin as a result of the molten resin filled in the cavity coming in contact with the member forming the outer circumferential end of the substrate and thereby causing the density to increase, and the resin within the cavity is cooled from the circumferential side that is more outward than the inner circumference and middle circumference, in particular from the outer circumferential end, and solidification progresses initially from such outer circumferential end.

In order to record information of a large capacity without changing the size of the substrate in an optical recording medium, it is necessary to reduce the size of the beam spot for recording and reproducing information on the optical recording medium. Thus, in order to increase the recording capacity, the distance (working distance) from the pickup that focuses the beam to the optical recording medium must be narrowed. This means that the maximum angle of incidence of the beam to fall incident on the optical recording medium will increase. Meanwhile, with a magnetic recording medium of a hard disk device, information is recorded, reproduced and erased using a flying head that floats in the air. In order to record information of greater capacity in a magnetic recording medium, the distance between the flying head and the magnetic recording medium needs to be narrowed since the magnetic field emitted from the head generated in a narrower area needs to reach the magnetic recording medium.

With optical recording mediums, research is being conducted for reducing the size of the beam spot by combining a solid immersion lens (SIL) with a condenser lens. With this technology, in order to obtain a capacity of 500 GB with an optical recording medium having a diameter of 120 mm, it is said that the distance from the solid immersion lens to the optical recording medium needs to be 50 nm or less. Moreover, research is also being conducted for reducing the floating distance of the flying head of a magnetic recording medium. In order to obtain a capacity of 500 GB with a magnetic recording medium having a diameter of 90 mm, it is said that the floating distance needs to be 10 nm or less. Meanwhile, with BD (Blu-ray disk) that has been put into practical use, the distance from the condenser lens to the optical recording medium is 0.3 mm.

When the distance from the pickup or head to the information recording medium is narrowed as described above, there is a possibility that the information recording medium and the pickup or head may collide if the unevenness on the surface of the information recording medium is large. Moreover, even if they do not collide, since the distance between the information recording medium and the pickup or the head will become inconsistent, the recording, reproduction and erasing of information with the information recording medium will be affected. If there is an edge wedge in the vicinity of the outer circumferential end of the resin substrate molded with the injection molding method, information cannot be recorded in the vicinity of the outer circumferential end of the information recording medium.

Moreover, as the distance from the pickup or the head to the information recording medium is narrowed, information cannot be recorded in a broader range at the outer circumference of the information recording medium. This is because, since the pickup or the head has a certain degree of width, the distance from such portion to the recording medium becomes smaller than the tolerance, and will affect the recording, reproduction and erasing of information with the information recording medium.

Moreover, since the distance of the circle of the outer circumferential part is longer in comparison to the inner circumferential part, even if it is the same radial distance, the outer circumferential part can record more information than the inner circumferential part. Accordingly, it is essential to reduce the edge wedge in the vicinity of the outer circumference of the resin substrate in order to increase the recording capacity of the information recording medium.

Meanwhile, if it is possible to eliminate the edge wedge in the vicinity of the outer circumference of the resin substrate manufactured with injection molding, a recording medium with a larger capacity than the existing BD can be manufactured by applying existing technologies.

As a method for eliminating the edge wedge of the resin substrate after performing injection molding, cutting or grinding can be performed. Specifically, after molding the resin substrate in a slightly larger size, the portion containing the edge wedge of the outer circumferential is cut, and the inner circumferential part thereof is used as the resin substrate. Otherwise, without changing the outer diameter of the resin substrate, the swelling of the actual edge wedge of the resin substrate can be removed by cutting or grinding. Nevertheless, the method of removing the edge wedge after performing injection molding results in increased manufacturing processes.

Thus, as a method of reducing the edge wedge of the resin substrate using the injection molding method that does not require the foregoing after processing, known is a method of providing a heat preventing mechanism to the die and delaying the cooling and solidification at the outer circumferential end of the resin substrate. For example, disclosed are technologies of providing, as the heat preventing mechanism, a resistance heater, a film resistance heater or an induction heater to an outside retainer (corresponds to 108 in FIG. 13) which forms the outer circumferential end of the resin substrate with the die, or circulating heated water or oil in the outside retainer (for example, refer to Patent Document 1). Moreover, as other methods of reducing the edge wedge, as shown in FIG. 16, disclosed are technologies of increasing the thickness of the outer circumferential end of the stamper 115 mounted on the die, or, as shown in FIG. 17, narrowing the gap in the cavity in the vicinity of the outer circumferential end of the resin substrate by retaining the stamper 115 so that the outer circumferential end of the stamper 115 is warped toward the cavity side (refer too Patent Document 1 and Patent Document 2).

Nevertheless, the conventional methods entail the following problems.

Foremost, with a die provided with a heat preventing mechanism as with Patent Document 1, although it is effective in reducing the amount of the edge wedge, it is unable to completely eliminate the edge wedge.

Moreover, with the method of increasing the thickness of the outer circumference of the stamper as with Patent Document 1, not only is it troublesome, the reproducibility is low since the thickness tends to change for each stamper.

Moreover, with a die in which the vicinity of the outer circumferential end of the stamper is deformed as with Patent Document 2, since the stamper is subject to repeated deformation of bending and returning to its original form each time one resin substrate is molded, the stamper wears easily and its life is shortened.

PRIOR ART DOCUMENTS

Patent Documents

Patent Document 1: Japanese Translation of PCT Application No. 2003-501776
Patent Document 2: Patent Publication No. 3848549

SUMMARY OF INVENTION

The present invention was devised in order to resolve the foregoing conventional problems. Specifically, an object of this invention is to reduce the edge wedge without shortening the life of the stamper and without impairing the productivity of the disk substrate.

The disk substrate molding apparatus according to one aspect of the present invention comprises a disk substrate molding die and a temperature controller. The disk substrate molding die has a stamper, a first die including a mirror member to which the stamper comes in contact, and a second die including a molding surface which forms a disk-shaped cavity between the molding surface and the stamper. The second die includes a protruding part which protrudes toward the stamper at an outer circumferential part of the molding surface. The temperature controller controls temperature of the second die so that the protruding part exhibits a higher temperature in comparison to a region further toward the inner circumferential side than the protruding part, and controls temperature of the first die so that a region opposite to the protruding part exhibits a lower temperature in comparison to the protruding part in the mirror member.

The disk substrate molding method according to another aspect of the present invention is a method of molding a disk substrate using a disk substrate molding die having a stamper, a first die including a mirror member to which the stamper comes in contact, and a second die including a molding surface which forms a disk-shaped cavity between the molding surface and the stamper. The second die includes a protruding part which protrudes toward the stamper at an outer circumferential part of the molding surface, and the disk substrate molding method controls temperature of the second die so that the protruding part exhibits a higher temperature in comparison to a region further toward the inner circumferential side than the protruding part, and controls temperature of the first die so that a region opposite to the protruding part exhibits a lower temperature in comparison to the protruding part in the mirror member.

The disk substrate molding die according to yet another aspect of the present invention is a disk substrate molding die for use in the disk substrate molding, having a stamper, a first die including a mirror member to which the stamper comes in contact, and a second die including a molding surface which forms a disk-shaped cavity between the molding surface and the stamper. The second die has a protruding part which protrudes toward the stamper at an outer circumferential part of the molding surface, an outer thermostatic water passage positioned in an area including the protruding part, an inner thermostatic water passage that is formed separately from the outer thermostatic water passage and which is positioned in an area including a region further toward the inner circumferential side than the protruding part, and a heat transfer preventing part which prevents heat transfer between the area including the protruding part and the area including a region further toward the inner circumferential side than the protruding part.

According to the present invention, a disk substrate molded with a molding die, in which a stamper is provided to only one die of the pair of dies, can be flattened.

BRIEF DESCRIPTION OF THE DRAWINGS

FIG. 8 is a diagram showing the relationship of the edge wedge width and the amount of protrusion.

FIG. 9 is a diagram showing the relationship of the amount of protrusion and the temperature difference between the non-stamper-side dual water passages in a case where the substrate thickness is 1.1 mm.

DETAILED DESCRIPTION OF INVENTION

Embodiments of the present invention are now explained in detail with reference to the appended drawings.

Before explaining the configuration of the disk substrate molding die and molding apparatus of this embodiment, the edge wedge (ski jump) that arises in the vicinity of the outer circumferential end of the resin substrate molded with injection molding is explained.

Figure 6:
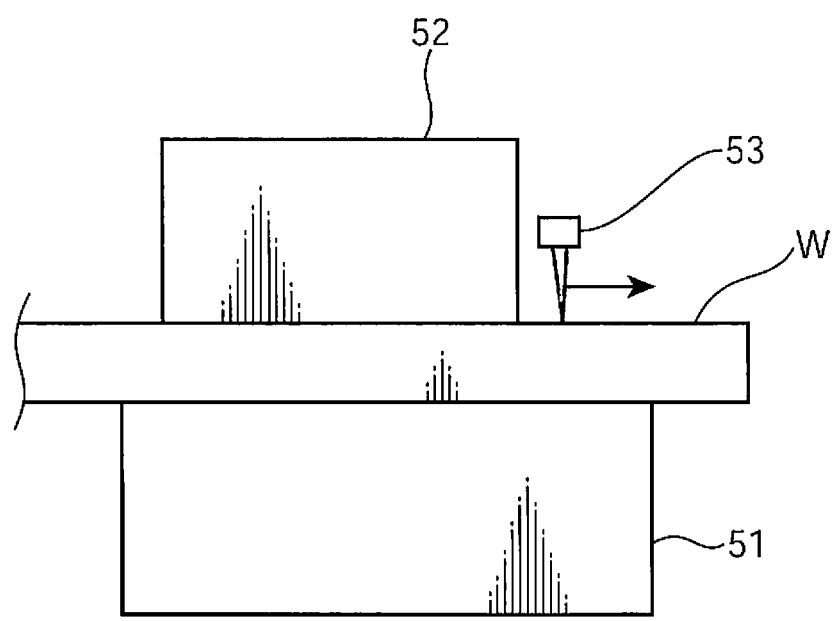
FIG. 6 is a diagram explaining the method of measuring the edge wedge.

Foremost, in order to accurately examine the shape of the edge wedge, the shape of the edge wedge was measured with the measurement device shown in FIG. 6. In this measurement, a disk substrate W was placed horizontally on a support base 51 with a surface that was ground and flattened, and a weight 52 was placed on the disk substrate W. Here, the disk substrate W was placed on the support base 51 so that a range of 3 mm from the outer circumferential end of the disk substrate W protrudes outward (laterally) from the support base 51. This is in order to prevent the area where the edge wedge of the disk substrate W is formed from being placed on the support base 51 and causing the disk substrate W to bend. Moreover, the weight 52 is placed on the disk substrate so as to sandwich the disk substrate W between the support base 51 and the weight 52, but here, the weight 52 is not placed on a range of 5 mm from the outer circumferential end of the disk substrate W. This is because such range is the target of measurement. Subsequently, a probe 53 of a surface roughness meter was scanned across a length of 5 mm from the inner circumferential side to the outer circumferential side on the disk substrate W.

Figure 7:
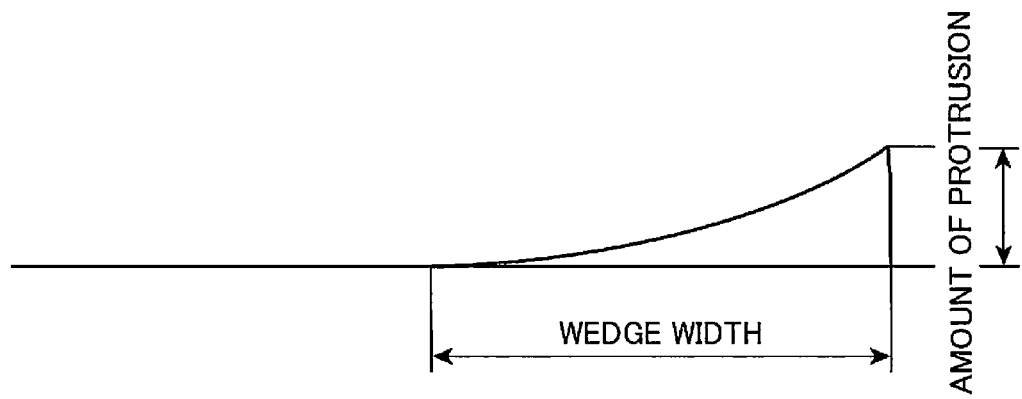
FIG. 7 is a diagram explaining the shape of the edge wedge.

The probe 53 is connected to the surface roughness meter not shown, and the displacement of the surface of the disk substrate W obtained with the surface roughness meter was recorded. An example of the measurement results is shown in FIG. 7. In FIG. 7, the left side of the diagram is the inner side of the disk substrate W, and the right side of the diagram is the outer side of the disk substrate W. The starting point from the portion (base part) with no surface displacement on the left side which changes toward the direction where the disk substrate W becomes thick (direction where the top face increases in height) is the initial rise part of the ski jump (inner end part of the edge wedge). The difference between the surface height at the position where the surface displacement becomes maximum and the surface height at the base part where the thickness is uniform is referred to as the amount of protrusion. Moreover, the radial length of the area where the edge wedge is formed is referred to as the wedge width. The position where the amount of surface displacement of the edge wedge becomes maximum is the outer circumferential end of the disk substrate W. Accordingly, the wedge width represents the distance between the inner end part of the edge wedge and the outer circumferential end of the disk substrate W.

The relationship of the amount of protrusion and the wedge width measured with the measurement device is shown in FIG. 8. FIG. 8 shows the measurement result with a substrate having a thickness of 1.1 mm. As evident from FIG. 8, the smaller the amount of protrusion, the shorter the wedge width. Moreover, the shape of the edge wedge was the same on both the stamper-side surface (one surface of the disk substrate W) and the non-stamper side surface (other surface of the disk substrate W). If the wedge width (mm) is x and the amount of protrusion (μm) is y, Formula (1) was obtained as the approximate curve.

$$y=3x^{2.5} \tag{1}$$

Note that the shape of the edge wedge was also examined with a substrate having a thickness of 0.6 mm, and the results were basically the same as the curve shown in FIG. 8.

First Embodiment

Figure 1:
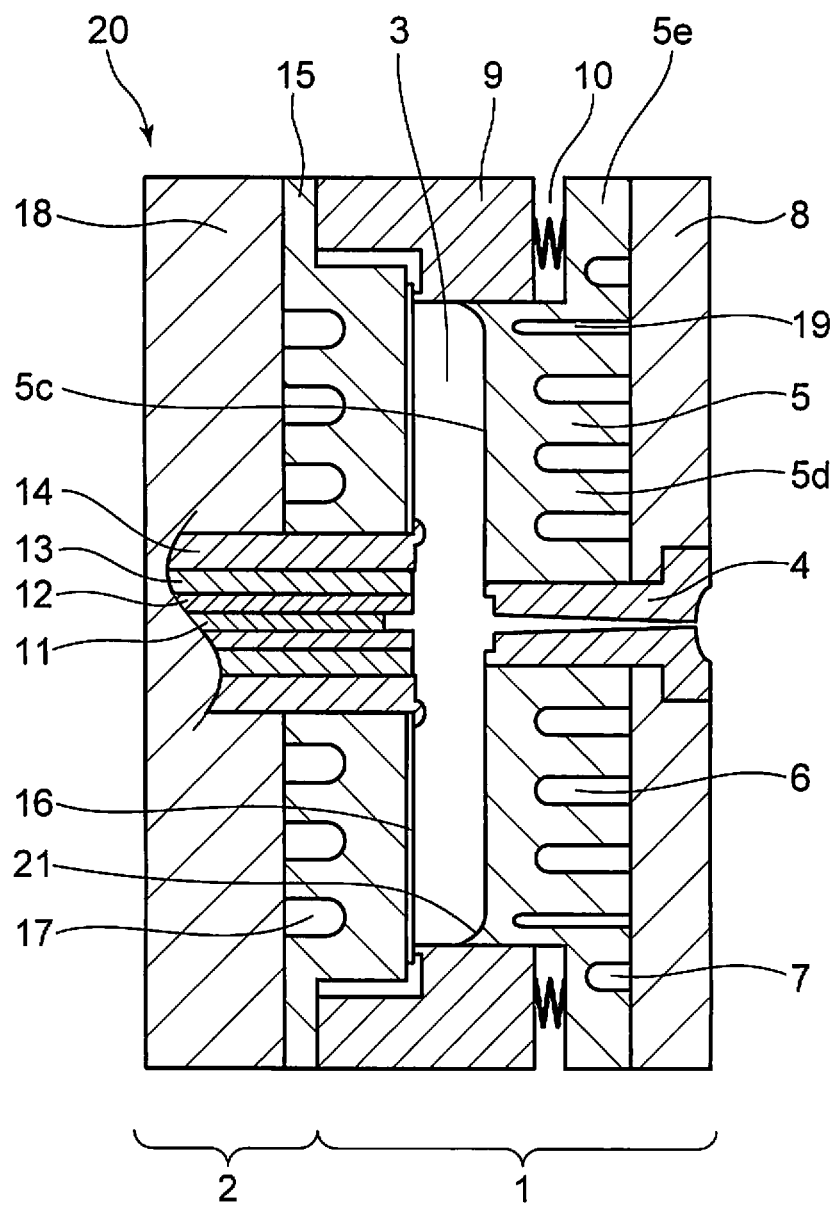
FIG. 1 is a cross section of the disk substrate molding die according to the first embodiment of the present invention.

FIG. 1 is a cross section of the disk substrate molding die 20 according to the first embodiment of the present invention.

As shown in FIG. 1, a disk substrate molding die (hereinafter simply referred to as the "molding die 20") 20 comprises a fixed-side die 1 as a second die, and a movable-side die 2 as a first die. The space created by closing the fixed-side die 1 and the movable-side die 2 is a cavity 3.

The fixed-side die 1 comprises a sprue bush 4, and a fixed-side mirror plate 5 as a mirror member. The sprue bush 4 and the fixed-side mirror plate 5 are disposed in order from the inner circumferential side. The sprue bush 4 is a member for causing the molten resin extruded from a nozzle (not shown) of the injection molding machine to flow into the cavity 3 of the molding die 20. The fixed-side mirror plate 5 includes a molding surface 5c for forming the disk substrate, and the molding surface 5c forms the disk-shaped cavity 3 between the molding surface and a stamper 16 disposed at the movable-side die 2.

The fixed-side die 1 is formed with, on the fixed-side mirror plate 5, a water passage 6 as an inner thermostatic water passage and a water passage 7 as an outer thermostatic water passage. Temperature-controlled water is circulated in the respective water passages 6, 7. Temperature of the fixed-side mirror plate 5; that is, temperature of the fixed-side die 1 is controlled.

The sprue bush 4 and the fixed-side mirror plate 5 are respective joined with the fixed-side plate 8, and are supported by the fixed-side plate 8.

The fixed-side die 1 comprises an outer circumferential ring 9 as an annular outer circumferential member. The outer circumferential ring 9 is a member with an inner surface that defines the outer circumferential surface of the disk substrate, and is provided concentrically with the fixed-side mirror plate 5. The fixed-side mirror plate 5 includes a molding part 5d formed with a molding surface 5c, and an outer supporting part 5e that is positioned on the outer circumferential side of the molding part 5d and which has a surface that is one step lower than the molding surface 5c. The outer circumferential ring 9 is fitted into the outside of the molding part 5d and can be displaced in the moving direction of the movable-side die 2 with the spring 10.

The movable-side die 2 comprises an ejector pin 11, a cut punch 12, an ejector 13, a stamper holder 14, and a movable-side mirror plate 15 as a mirror member, and these are disposed in order from the inner circumferential side. The cut punch 12 is a member for forming an inner hole in the molten resin that was filled in the cavity 3. The ejector pin 11 and the ejector 13 protrude from the mirror disk 15 after the molten resin is solidified. The ejector pin 11 and the ejector 13 are used for removing, from the movable-side die 2, the substrate part molded from the molten resin and the unneeded part in a mutually separated state. The stamper holder 14 is used for retaining the stamper 16 with the movable-side mirror plate 15. The stamper 16 is formed in a flat-plate ring disk shape with an inner hole formed therein, and the stamper holder 14 retains the stamper 16 by pressing the edge of the inner hole of the stamper 16. The stamper 16 is used for forming fine concavity and convexity on the substrate surface, and is generally made of nickel. The stamper 16 is disposed along one main surface of the disk-shaped cavity 3 (main surface that is opposite to the molding surface 5c of the fixed-side mirror plate 5).

The movable-side mirror plate 15 is provided with a water passage 17. Temperature-controlled water is circulated in the water passage 17. Temperature of the movable-side mirror plate 15; that is, temperature of the movable-side die 2 is controlled. The movable-side mirror plate 15 is joined with the movable-side plate 18, and supported by the movable-side plate 18.

Figure 13:
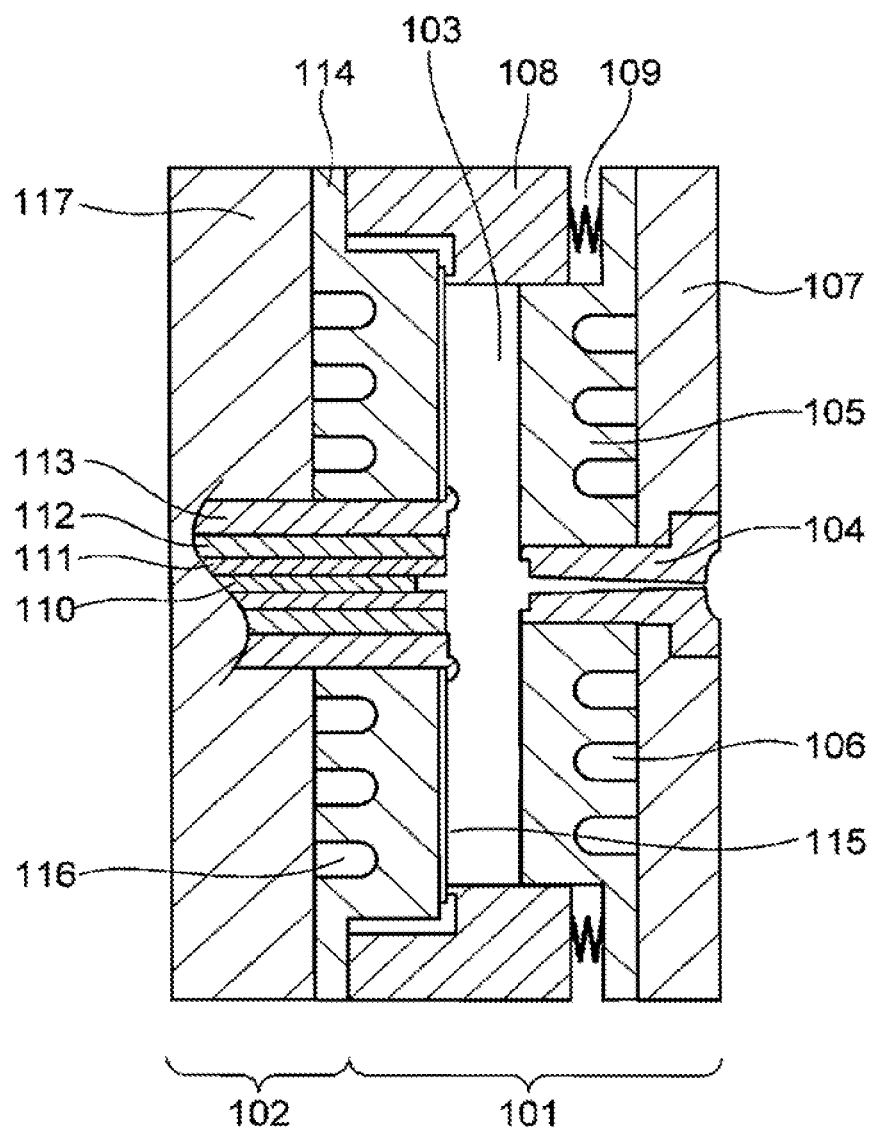
FIG. 13 is a cross section of a conventional disk substrate die.
Figure 14:
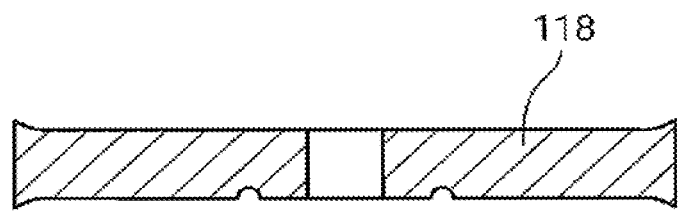
FIG. 14 is a cross section of the disk substrate obtained by using a conventional disk substrate die.
Figure 15:
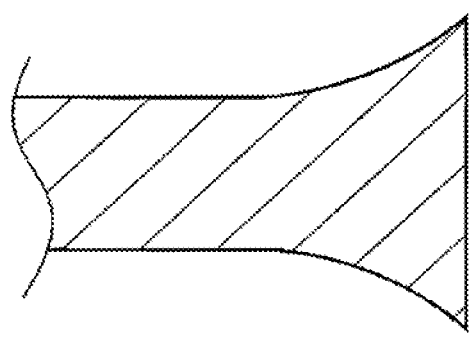
FIG. 15 is a cross section of the vicinity of the outer circumferential end of the disk substrate obtained by using a conventional disk substrate die.
Figure 16:
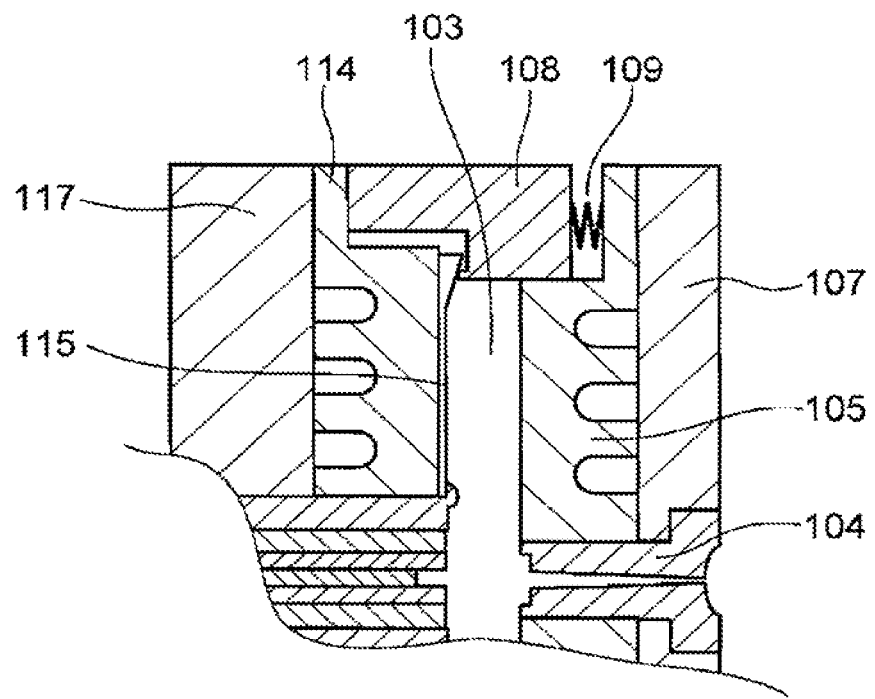
FIG. 16 is an enlarged cross section partially showing a conventional disk substrate die.
Figure 17:
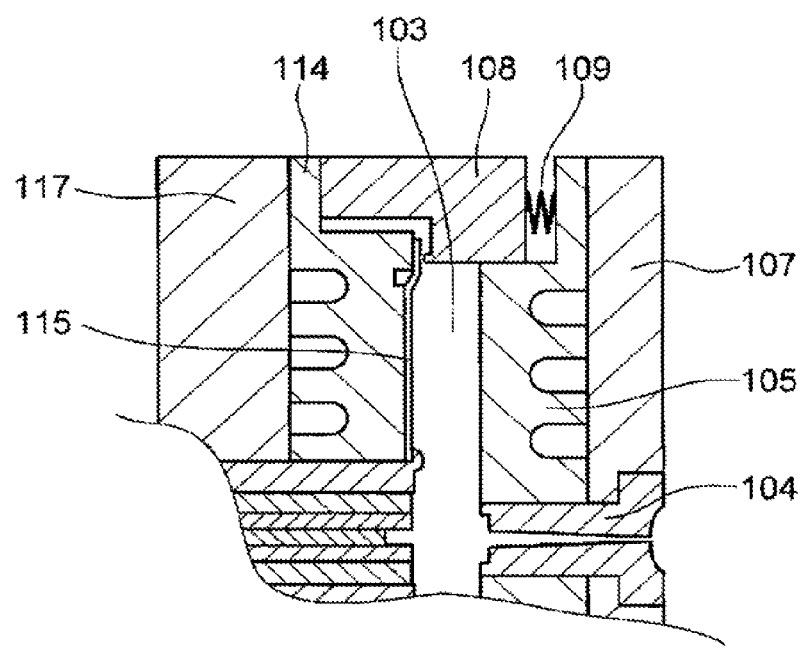
FIG. 17 is an enlarged cross section partially showing a conventional disk substrate die.

The fixed-side mirror plate 5 in the molding die 20 of the first embodiment has a protruding part 21 protruding toward the stamper side unlike the conventional fixed-side mirror plate 105 shown in FIG. 13. The protruding part 21 is formed at the outer circumferential end part of the molding part 5d so that it will be concentric with the molding surface 5c of the fixed-side mirror plate 5, and has the same protrusion height and same cross section shape at any position in the circumferential direction. In addition, the protruding part 21 is shaped so that it protrudes to the side of the cavity 3 toward the outer circumferential part of the stamper 16 at the outer circumferential part of the molding surface 5c as it heads toward the outer circumferential end part thereof. Specifically, the molding surface 5c of the fixed-side mirror plate 5 has a shape where a curved protruding surface is smoothly connected from the outer circumferential part of a flat disk-shaped surface.

Since the Formula (1) obtained as described above shows the amount of swelling of the edge wedge on one surface of the disk substrate (resin substrate), the shape of the protruding part 21 provided to the fixed-side mirror plate 5 is defined to be double the amount of protrusion thereof. Specifically, if the distance from the outer circumferential end of the molding surface 5c (outer circumferential end surface of the molding part 5d) is x (mm), the amount of protrusion of the protruding part 21 at the position of distance x from the outer circumferential end (outer circumferential end surface of the molding part 5d) is y (µm), and the radial width (wedge width) from the outer circumferential end of the molding surface 5c to the radial inner end part of the protruding part 21 is $x_0$ (mm), the shape of the protruding part 21 satisfies the following Formula (2):

$$y=6(x_0-x)^{2.5} \tag{2}$$

Moreover, when considering that the thickness of the cavity 3 will decrease due to the protrusion of the fixed-side mirror plate 5, the shape of the protruding part 21 may also be formed to satisfy the following Formula (3). This Formula (3) is a formula which corrects the amount of protrusion of the protruding part 21, for example, in cases where the thickness of the cavity 3 is 1.1 mm (1100 µm) if the outer circumferential end of the fixed-side mirror plate 5 is not caused to protrude.

$$y=6(x_0-x)^{2.5} \times 1100/[1100+6(x_0-x)^{2.5}] \tag{3}$$

As a result of providing the protruding part 21 of a shape that satisfies the foregoing Formula (2) or (3), the thickness of the cavity 3 becomes narrow toward the outer circumferential side, and is set off with the increase in thickness caused by the edge wedge at the outer circumference of the disk substrate molded with the injection molding method. Accordingly, the thickness of the disk substrate becomes uniform in the circumferential direction, and additionally becomes uniform from the inner circumference to the outer circumferential.

The surface processing of the fixed-side mirror plate 5 can be performed with precision, and reproducibility can be maintained so as long as the die is not changed.

Figure 2:
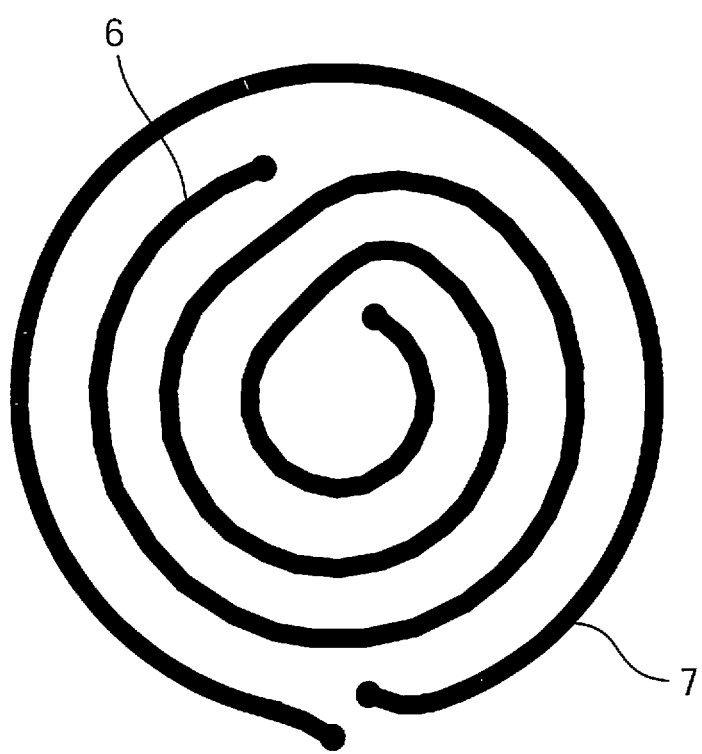
FIG. 2 is a plan view showing the arrangement of the water passage formed on the fixed-side mirror plate of the disk substrate molding die.

FIG. 2 shows the water passage 6 and the water passage 7 provided to the fixed-side mirror plate 5. The water passage 6 and the water passage 7 mutually formed concentrically, and are mutually separated and independent. Specifically, water of different temperatures can flow through the water passage 6 and the water passage 7. The water passage 6 is formed from the inner circumferential position of the fixed-side mirror plate 5 to a position toward the outer circumferential. The water passage 7 is positioned more on the outer circumferential side than the water passage 6, and formed at a position in the vicinity of the outer circumferential end of the fixed-side mirror plate 5.

A void 19 is formed between the water passage 6 and the water passage 7 of the fixed-side mirror plate 5. Specifically, the void 19 is formed at a position corresponding to the inner end part in the protruding part 21. To put it differently, the void 19 is formed at a position corresponding to the inner end part of the protruding part 21 (outer circumferential part of the flat surface of the molding surface 5c) in the radial direction of the fixed-side mirror plate 5. The water passage 6 is provided more on the inner circumferential side than the void 19, and the water passage 7 is provided more on the outer circumferential side than the void 19. Specifically, the water passage 7 is positioned in an area including the protruding part 21 in the fixed-side mirror plate 5, and the water passage 6 is positioned in an area including a region further toward the inner circumferential side than the protruding part 21. The water passage 6 and the water passage 7 are formed with predetermined spacing formed therebetween.

The void 19 has a cross section shape with a narrow radial width, and is formed concentrically with the molding part 5d in an annular shape. The void 19 is provided for reducing the heat transfer between the inner circumferential side and the outer circumferential side of the void 19. Specifically, the void 19 functions as a heat transfer preventing part which prevents heat transfer between the area including the protruding part 21 and the area including a region further toward the inner circumferential side than the protruding part 21. As a result of the void 19 being formed on the fixed-side mirror plate 5, the inner circumferential side and the outer circumferential side of the void 19 can be maintained at different temperatures in the fixed-side mirror plate 5. It is thereby possible to separately maintain an even temperature in the inner circumferential region where the water passage 6 is located and the outer circumferential region where the water passage 7 is located in the molding surface 5c (cavity 3 surface) of the fixed-side mirror plate 5.

The die material is stainless steel, and the fixed-side mirror plate 5 and the movable-side mirror plate 15 are configured from HPM38 manufactured by Hitachi Metals.

Figure 3:
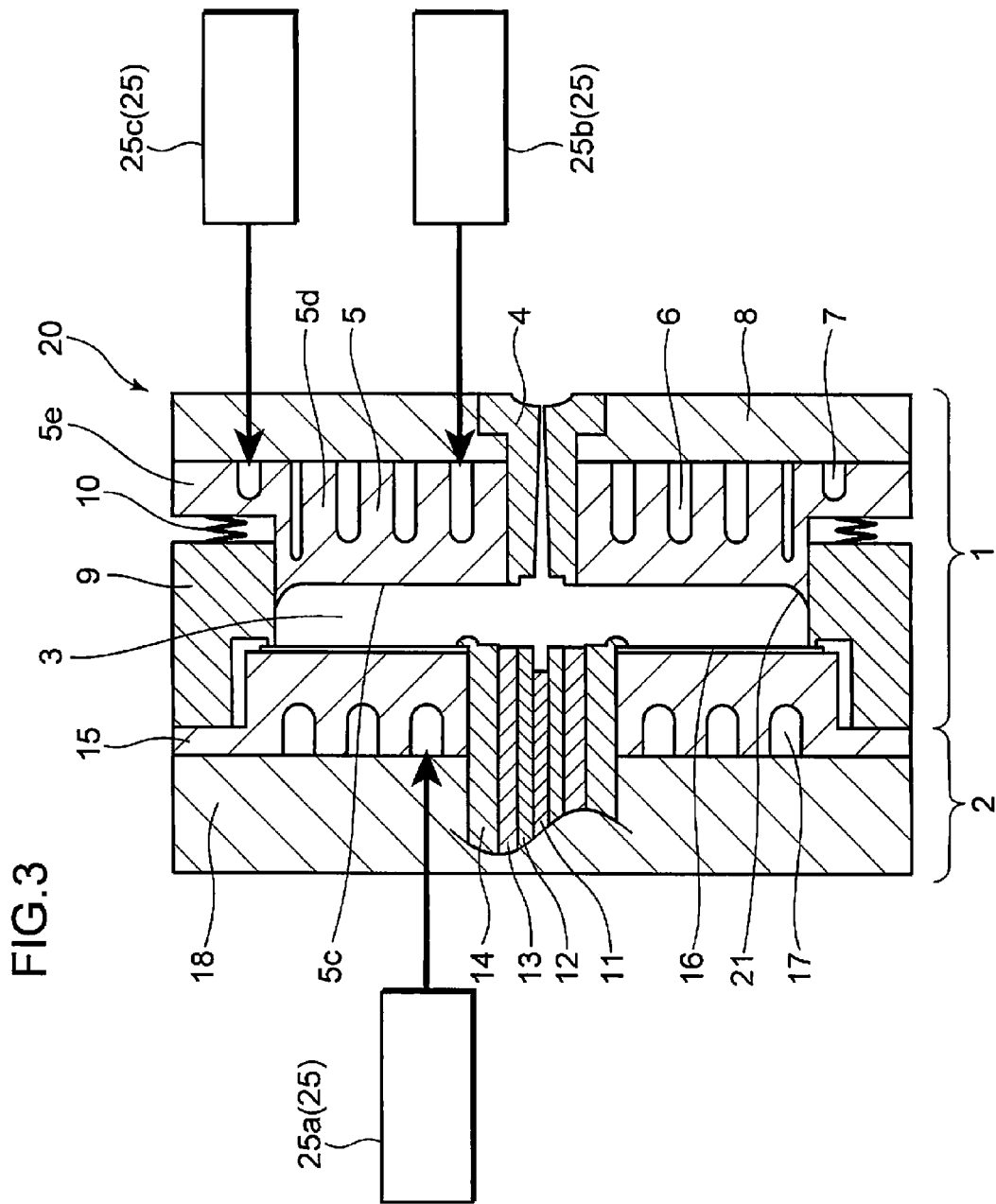
FIG. 3 is a diagram schematically showing the configuration of the disk substrate molding apparatus according to the first embodiment of the present invention.

As shown in FIG. 3, the water passage 6 and the water passage 7 provided to the fixed-side mirror plate 5, and the water passage 17 provided to the movable-side mirror plate 15 are all connected to the temperature controller 25. The temperature controller 25 includes a first supplying part 25a for supplying water to the water passage 17, a second supplying part 25b for supplying water to the water passage 6, and a third supplying part 25c for supplying water to the water passage 7. The first to third supplying parts 25a to 25c independently control the temperature of the supplied water. Accordingly, they can respectively circulate and supply water of different temperatures.

Figure 4:
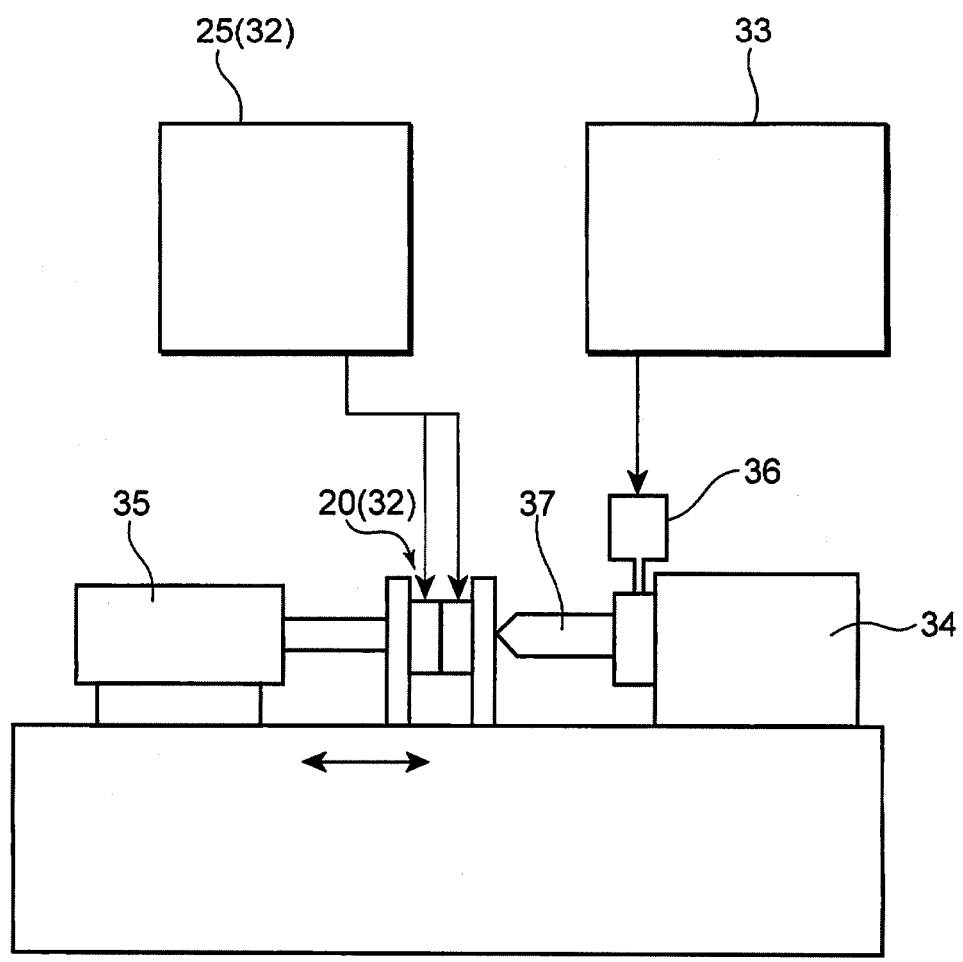
FIG. 4 is a diagram schematically showing the configuration of the disk molding system according to the first embodiment of the present invention.

FIG. 4 shows an outline of a molding system 30. The molding system 30 comprises the disk substrate molding apparatus 32 of this embodiment comprising the molding die 20 and the temperature controller 25. Moreover, the molding system 30 additionally comprises a material supplying device 33, an injection machine 34, a mold clamping machine 35, a hopper 36 and the like. The material supplying device 33 is a device for supplying, to the hopper 36, the resin material such as polycarbonate to be molded after drying such resin material. The hopper 36 is provided on the injection machine 34, and the resin material supplied to the hopper 36 is supplied to the injection machine 34. The resin material that is supplied to the hopper 36 is of a pallet having a given diameter and length.

The resin material supplied to the injection machine 34 is heated with a heating cylinder 37 provided to the injection machine 34 and becomes a molten state. Subsequently, the molten resin is kneaded with a screw disposed inside the heating cylinder 37, and thereafter injected into the cavity 3 within the molding die 20 with a piston not shown. Compressive pressure is applied to the molten resin within the molding die 20 using the mold clamping machine 35 in a direction of closing the movable-side die 2, and the molten resin is simultaneously cooled. Here, since the temperature is set to be high in the vicinity of the outer circumferential end of the fixed-side mirror plate 5 as a mirror member on the non-stamper side, the cooling rate of the molten resin is slow. Subsequently, after the resin is solidified, the movable-side die 2 is opened with the mold clamping machine 35, and the molded piece is removed with an ejecting machine not shown. The molded piece removed from the molding die 20 has a shape where the outer end part is warped toward the stamper side. Nevertheless, since the temperature of the outer end part of the surface on the non-stamper side is higher than the temperature of the region on the stamper side, the molded piece is compresses more on the non-stamper side than the stamper side during its cooling and solidification based on the bimetallic effect. Thus, the warping of the molded piece is forced, and it is thereby possible to obtain a disk substrate with a uniform thickness. Note that the radial tilt of the disk substrate is in a changing state of an approximately constant amount from the inner circumferential part to the outer circumferential part. Specifically, it is of a state where even stress is applied to the entire circumference of the disk substrate. Thus, the radial tilt of the disk substrate is forced as a result of even stress being applied to the entire circumference of the disk substrate with coating or cover resin or the like, and, ultimately, a flat disk substrate is obtained.

The results of test that were actually conducted are now explained. In this test, the distance from the molding surface 5c of the fixed-side mirror plate 5 to the water passage 6 was set to 8 mm. Moreover, the distance from the surface of the outer supporting part 5e of the fixed-side mirror plate 5 to the water passage 7 was set to 4 mm. Moreover, the distance from the cavity surface of the movable-side mirror plate 15 to the water passage 17 was set to 8 mm.

The distance between the void 19 provided between the water passage 6 and the water passage 7 and the molding surface 5c of the fixed mirror disk 5 was set to 2 mm, and the distance between the void 19 and the outer circumferential surface of the molding part 5d of the fixed mirror disk 5 (surface to which the outer circumferential ring 9 comes in contact) was set to 1.9 mm. The width of the void 19 was set to 1 mm.

Here, the area between the outer circumferential surface of the molding part 5d (surface to which the outer circumferential ring 9 comes in contact) and the void 19 in the fixed mirror disk 5 is an area where the surface of the resin substrate will swell due to the edge wedge unless the edge wedge is corrected, and, in this first embodiment, is an area where the disk substrate (resin substrate) is caused to deform and warp to the side that is opposite to the stamper 16. Moreover, it is also an area where the surface is caused to protrude at the outer circumferential part in the molding part 5d of the fixed mirror disk 5 on the side that is opposite to the stamper 16.

In a case where the outer diameter of the disk substrate is 120 mm, thickness is 1.1 mm, resin material is polycarbonate resin, molding tact is 6 seconds, injection screw diameter is 28 mm, maximum injection rate is 200 mm/sec, and maximum mold clamping force is 20 tons, with a conventional disk substrate molding apparatus, the temperature of the temperature control water of the water passage 106 located in the fixed-side mirror plate 105 and the water passage 116 located in the movable-side mirror plate 114 was 115° C., respectively. In the foregoing case, the amount of protrusion of the resin substrate surface was 15 µm. Here, the temperature of the temperature control water refers to the temperature of the temperature control water that is delivered from the temperature controller 25 to the water passage within the molding die 20, and the temperature immediately before being delivered from the temperature controller 25 to the molding die 20.

Meanwhile, with the disk substrate molding apparatus 32 of this first embodiment, in a case where the temperature of the temperature control water supplied to the water passage 6 of the fixed-side mirror plate 5 is 115° C., the temperature of the temperature control water supplied to the water passage 7 is 135° C., and the temperature of the temperature control water supplied to the water passage 17 of the movable-side mirror plate 15 is 115° C., the concavity and convexity of the stamper 16 were sufficiently transferred to the disk substrate, and it was possible to obtain a disk substrate with the same level of radial tilt as the disk substrate manufactured with a conventional disk substrate die.

Figure 5:
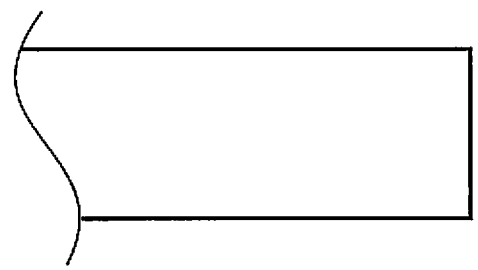
FIG. 5 is a cross section schematically showing the outer circumferential part of the disk substrate obtained by using the disk substrate die.

FIG. 5 shows a cross section shape at the outer circumferential part of the disk substrate manufactured with the disk substrate molding apparatus 32 according to the first embodiment. With this disk substrate, the thickness is constant from the region toward the outer circumference to the outer circumferential end, and no bend can be observed. Specifically, no edge wedge was observed in the disk substrate.

Since the fixed-side mirror plate 5 has a shape of protruding to the inner side at the outer circumferential part of the cavity 3, when the molded piece is removed from the molding die 20, the vicinity of the outer circumferential end of the molded piece has a shape of warping toward the side of the stamper 3. Nevertheless, it is evident that, as the cooling of the molded piece progresses, the warping to the non-stamper side is forced due to the bimetallic effect. It is thereby possible to obtain a disk substrate without any edge wedge.

Note that the reason why the radial tilt of the disk substrate is not set to zero is so that the disk substrate will become a flat shape when the disk substrate is formed upon being provided with a thin film or a protective layer made of resin. Specifically, the disk substrate is caused to warp in advance so as to negate the stress applied to the resin substrate with the thin film or protective layer made of resin.

The disk substrate manufactured with the injection molding method using the disk substrate molding die 20 of the first embodiment of the present invention is free from any protrusion, not only on the stamper side, but also on the non-stamper side. Thus, even if the surface of the non-stamper side is pressed against a flat surface, the surface of the stamper side will not deform. Accordingly, even when an ultraviolet cure resin or the like is laminated to the disk substrate or when a protective layer is formed, it is possible to obtain a laminated layer or protective layer with favorable film thickness distribution.

FIG. 9 shows the relationship of the temperature difference between the water passage 6 and the water passage 7 of the fixed-side mirror plate 5, and the amount of protrusion at the outer circumferential end of the protruding part 21. FIG. 9 shows the relationship in a case where the thickness of the disk substrate is 1.1 mm. Here, the water passage 7 is of a higher temperature than the water passage 6.

Displacement based on double the warping of the amount of protrusion shown in FIG. 9 relative to the temperature difference of the water passage 6 and the water passage 7 can be obtained with the bimetallic effect. Thus, in a case where the thickness of the disk substrate is 1.1 mm, it is necessary to keep the temperature difference at ±1.0 K based on the characteristics shown in FIG. 9 in order to keep the variation of displacement at the outer circumferential end of the disk substrate outer circumferential end within ±1.5 µm. Since the temperature controller 25 is able to control the temperature within the range of ±0.1 K, control of higher accuracy than ±0.2 µm can be easily performed.

FIG. 9 targets a disk substrate with a thickness of 1.1 mm, but if the thickness of the disk substrate is half of the foregoing thickness, the temperature difference between the water passage 6 and the water passage 7 should be half the values shown in FIG. 9. Specifically, the temperature difference between the water passage 6 and the water passage 7 and the amount of protrusion to be corrected are of a proportional relationship.

The glass transition temperature of polycarbonate resin is 148° C. If molding is not performed at a temperature that is lower than the foregoing temperature, the resin substrate will become fragile. Accordingly, the temperature difference between the water passage 6 and the water passage 7 in the die is preferably 30 K or less.

In the foregoing test, for the sake of comparison, although the water temperature to the water passage 6 of the fixed-side mirror plate 5 and the water temperature to the water passage 17 of the movable-side mirror plate 15 were made to be the same in the disk substrate molding die 20, these water temperatures may mutually differ.

Moreover, based on the relationship of FIG. 9 and the proportional relationship of the thickness of the disk substrate and the temperature difference between the non-stamper side dual water passages, in addition to cases where the amount of protrusion is 15 µm in the manufacture with a conventional disk substrate die, the temperature difference of the dual water passages can also be obtained.

With the molding die 20 of the first embodiment, since force in the bending direction is not applied to the stamper 3, the life of the stamper 3 will not be shortened.

Here, although a case of mounting the stamper 3 on the movable-side die 2 was explained, the stamper 3 may also be mounted on the fixed-side die 1. In the foregoing case, the relationship of the fixed-side mirror plate 5 and the movable-side mirror plate 15 is reversed. Specifically, the dual water passages are provided to the movable-side mirror plate 15, and a void is provided between these water passages.

Based on the characteristics shown in FIG. 8 or Formula (1), the amount of swelling is 0.5 µm at the position that is 0.5 mm on the outer circumferential side from the initial rise part. Thus, the distance between the void 19 and the outer circumferential surface in the molding part 5*d* of the fixed mirror disk 5 needs to preferably have an accuracy of ±0.2 mm relative to the numerical value obtained from the characteristics shown in FIG. 8 or Formula (1).

The distance between the void 19 provided between the water passage 6 and the water passage 7 and the molding surface 5*c* (cavity surface) of the fixed mirror disk 5 needs to be 2 mm or less in order to prevent heat transfer, and needs to be 1 mm or more from the perspective of the strength required for maintaining the surface shape of the fixed mirror disk 5.

Second Embodiment

Figure 10:
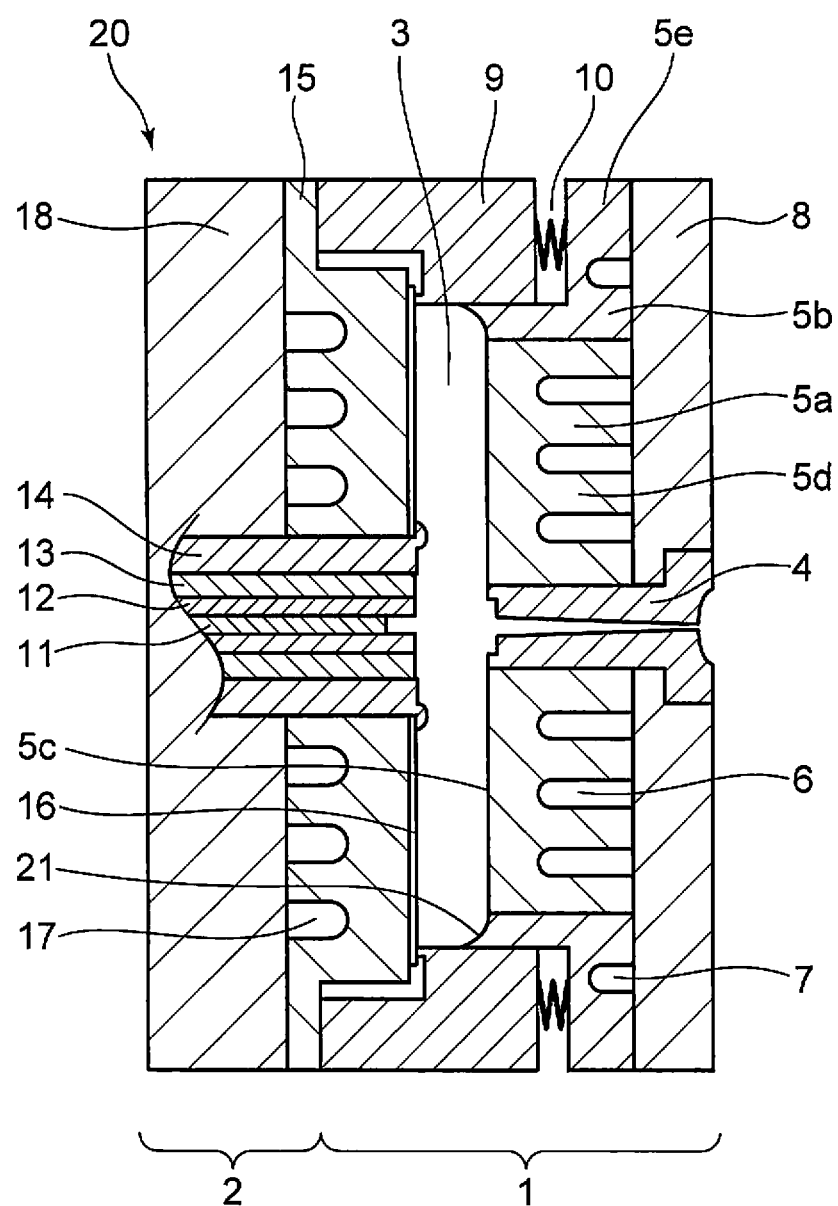
FIG. 10 is a cross section of the disk substrate die according to the second embodiment of the present invention.

FIG. 10 is a cross section of the disk substrate molding die 20 according to the second embodiment of the present invention.

Unlike the first embodiment where the fixed-side mirror plate 5 was configured from one member, with the molding die 20 of the second embodiment, the fixed-side mirror plate 5 is configured from two members; specifically, an inner member 5*a* and an outer member 5*b*. The inner member 5*a* configures a region further toward the radial inner side than the protruding part 21 in the fixed-side mirror plate 5, and has a flat region of the molding surface 5c. The inner member 5a is formed with the water passage 6. The outer member 5b is a member that is fitted to the outer side of the inner member 5a, and has a protruding part 21 and an outer supporting part 5e that is integrally formed with the protruding part 21 at its outer circumferential side. The outer supporting part 5e has a surface that is one step lower than the molding surface 5c. The outer member 5b is formed with the water passage 7.

Figure 11:
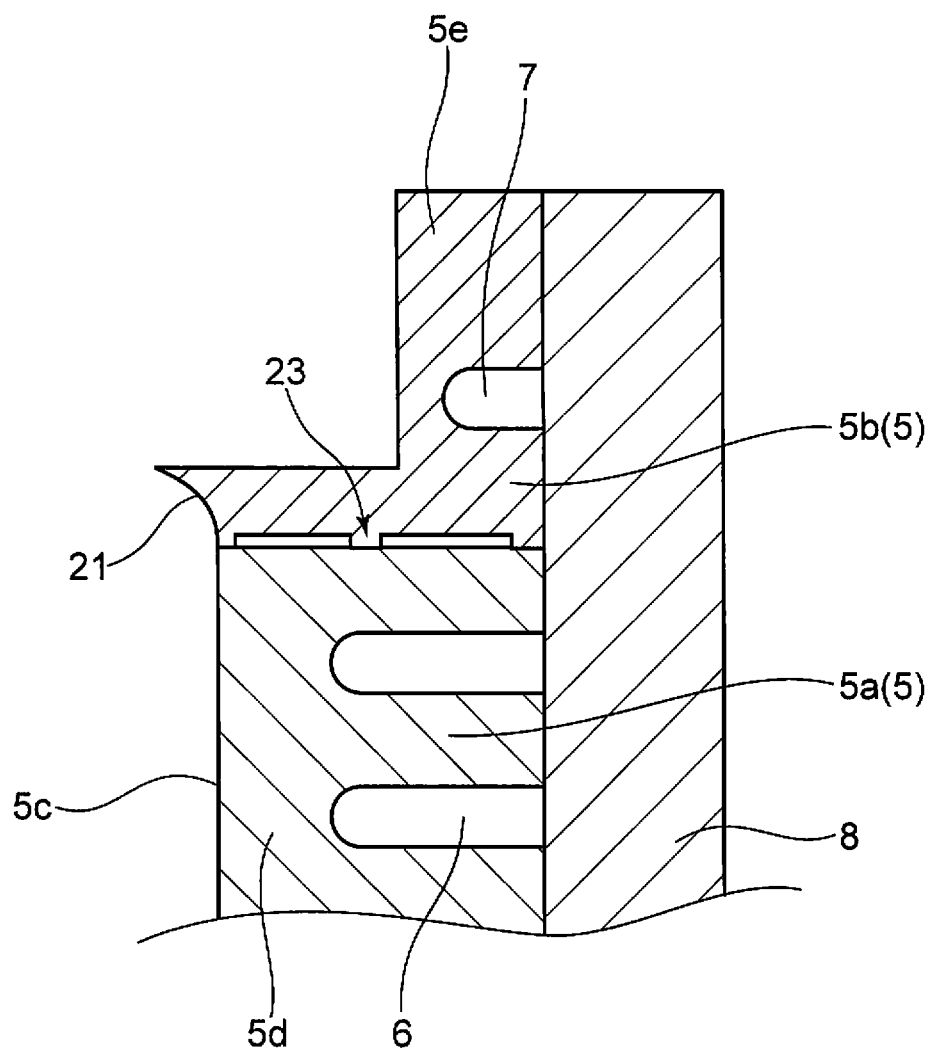
FIG. 11 is an enlarged cross section partially showing disk substrate die according to the second embodiment of the present invention.

FIG. 11 shows an enlarged view of the fitting part 23 of the inner member 5a and the outer member 5b. The gap between the inner member 5a and the outer member 5b in the fitting part 23 is the narrowest in the vicinity of the cavity 3 surface, and is larger at the other regions. A part where the gap is narrow is provided between the center part in the thickness direction and the region on the side of the fixed-side plate 8 provided with the water passage in the fitting part 23. This is in order to realize the positional accuracy of the outer member 5b relative to the inner member 5a, and prevent the heat transfer between the inner member 5a and the outer member 5b. Specifically, this gap functions as the heat transfer preventing part for preventing the heat transfer between the protruding part 21, and the region further toward the radial inner side than the protruding part 21.

The water passage 6 located in the inner member 5a and the water passage 7 located in the outer member 5b are mutually separated and independent as with the fixed-side die 1 of the first embodiment. Accordingly, the temperature of the inner member 5a and the temperature of the outer member 5b can be adjusted to be separate and even temperatures, respectively. The water passage 17 of the movable-side mirror plate 15 can also be separated and made independent from the water passage 6 and the water passage 7 of the fixed-side mirror plate 5. Thus, there is an advantage in that the transfer properties of the stamper 3 and the warping of the disk substrate can be independently controlled.

With the disk substrate molding die of the second embodiment, although the gap was formed narrow in the vicinity of the cavity 3 surface, at the center part in the thickness direction, and in the vicinity of the fixed-side plate 8 in the fitting part 23 of the inner member 5a and the outer member 5b, the configuration is not limited thereto, and the configuration, may also be such that the gap is narrowed at two locations; namely, in the vicinity of the cavity 3 surface and in the vicinity of the fixed-side plate 8.

Moreover, at the region where the gap width is narrow at the locations other than the vicinity of the cavity 3 surface of the fitting part 23, it is not necessary to set the same gap width across the entire circumference of the fixed-side mirror plate 5. For example, the configuration may also be such that a gap is intermittently formed in the circumferential direction, and such gap is formed with a groove in a shape extending in the thickness direction of the fixed-side mirror plate 5. With this configuration, resistance can be reduced upon fitting the inner member 5a and the outer member 5b.

The die material is stainless steel, and the fixed-side mirror plate 5 and the movable-side mirror plate 15 are configured from HPM38 manufactured by Hitachi Metals.

The distance from the cavity surface of the inner member 5a to the water passage 6 is, for example, 6 mm. Moreover, the distance from the surface on the side of the movable-side die in the outer member 5b to the water passage 7 is, for example, 4 mm. Moreover, the distance from the cavity surface of the movable-side mirror plate 15 to the water passage 17 is, for example, 6 mm. The radial thickness of the portion to which the outer circumferential ring 9 is fitted in the outer member 5b is, for example, 2.3 mm. Here, the portion where the outer circumferential ring 9 is fitted in the outer member 5b is also the portion of forming an area where the surface of the disk substrate will swell in cases where the edge wedge is not corrected, and is a portion for causing deformation of warping toward the side that is opposite to the stamper 16 after removal from the die. Moreover, this portion is also a portion that includes the protruding part 21 that is protruding from the flat part at the outer circumferential part of the molding surface 5c of the fixed mirror disk 5 on the side that is opposite to the stamper 16.

With the disk substrate molding die 20 according to the second embodiment also, the thickness becomes narrow as it heads toward the outer circumferential end at the outer circumferential part of the cavity 3. Thus, with a disk substrate molded with the injection molding method, the increase in thickness caused by the edge wedge of that outer circumferential part is set off. Accordingly, the thickness of the disk substrate becomes constant from the inner circumference to the outer circumference. The surface processing of the movable-side mirror plate 15 can be performed with precision, and reproducibility can be maintained so as long as the die is not changed.

In a case where the outer diameter of the disk substrate is 120 mm and the thickness of the disk substrate is 1.1 mm, and the resin material is polycarbonate resin, the conventional disk substrate die and the disk substrate molding die 20 according to the second embodiment were compared. The disk molding conditions were as follows; namely, molding tact was 4 seconds, injection screw diameter was 28 mm, maximum injection rate was 200 mm/sec, and maximum mold clamping force was 30 tons.

With a conventional disk substrate die, in a case where the temperature of the temperature controlled water to flow through the water passage 106 of the fixed-side mirror plate 105 and the temperature of the temperature controlled water to flow through the water passage 116 of the movable-side mirror plate 114 was 100° C., the amount of protrusion was 25 μm. Here, the temperature of the temperature controlled water refers to the temperature of the temperature controlled water that is delivered from the temperature controller 25 to the water passage within the die, and the temperature immediately before being delivered from the temperature controller 25 to the die.

Meanwhile, with the molding die 20 of the second embodiment, in a case where the temperature of the temperature controlled water to flow through the water passage 6 of the fixed-side mirror plate 5 is 100° C., the temperature of the temperature controlled water to flow through the water passage 7 is 133° C., and the temperature of the temperature controlled water to flow through the water passage 17 of the movable-side mirror plate 15 is 100° C., the concavity and convexity of the stamper 16 were sufficiently transferred to the disk substrate, and it was possible to obtain a disk substrate with the same level of radial tilt as the disk substrate manufactured with a conventional disk substrate die. In addition, with this disk substrate, the thickness was constant from the region toward the outer circumference to the outer circumferential end, and no bend was observed.

The disk substrate manufactured with the injection molding method using the disk substrate molding die 20 of the second embodiment of the present invention is free from any protrusion, not only on the stamper side, but also on the non-stamper side. Accordingly, if the surface on the non-stamper side is pressed by the flat surface, the surface on the stamper-side is not deformed. Thus, even when an ultraviolet cure resin or the like is laminated to the disk substrate or when a protective layer is formed, it is possible to obtain a laminated layer or protective layer with favorable film thickness distribution.

Since the fixed-side mirror plate 5 is formed with the protruding part 21 protruding to the cavity side at the outer member 5b corresponding to the outer circumferential part of the cavity 3 of the fixed-side mirror plate 5, when the disk substrate is removed from the die, the outer circumferential part of the disk substrate has a shape of warping toward the side of the stamper 3. Nevertheless, it is evident that, as the cooling of the molded piece progresses, the warping to the non-stamper side is forced due to the bimetallic effect.

Note that the reason why the radial tilt of the disk substrate is not set to zero is so that the disk substrate will become a flat shape when the disk substrate is formed upon being provided with a thin film or a protective layer made of resin. To put it differently, the disk substrate is provided with a radial tilt in advance so as to negate the stress applied to the resin substrate with the thin film or protective layer made of resin.

In a case where the thickness of the disk substrate is 1.1 mm, as the relationship of the temperature difference of the temperature of the temperature controlled water to flow through the water passage 6 of the inner member 5a and the temperature of the temperature controlled water to flow through the water passage 7 of the outer member 5b, and the amount that is ½ the displacement (corresponds to the amount of protrusion to be corrected) based on the warping that arises at the outer circumferential part of the disk substrate, the relationship shown in FIG. 9 can be used.

FIG. 9 targets a disk substrate with a thickness of 1.1 mm, but if the thickness of the disk substrate is half of the foregoing thickness, the temperature difference between the water passage 6 and the water passage 7 should also be half. Specifically, the temperature difference between the water passage 6 and the water passage 7 and the amount of protrusion to be corrected are of a proportional relationship.

The glass transition temperature of polycarbonate resin is 148° C. If molding is not performed at a temperature that is lower than the foregoing temperature, the resin substrate will become fragile. Accordingly, the temperature difference between the water passage 6 and the water passage 7 in the die is preferably 30 K or less.

With the second embodiment, since force in the bending direction is not applied to the stamper 3, the life of the stamper 3 will not be shortened.

With the second embodiment, although the water temperature of the water passage 6 of the inner member 5a of the fixed-side mirror plate 5 and the water temperature of the water passage 17 of the movable-side mirror plate 15 were made to be the same, the configuration is not limited thereto, and the water temperature of the water passage 6 and the water temperature of the water passage 17 may differ.

In the second embodiment, although a case of mounting the stamper 3 on the movable-side die 2 was explained, the stamper 3 may also be mounted on the fixed-side die 1. In the foregoing case, the relationship of the fixed-side mirror plate 5 and the movable-side mirror plate 15 is reversed. Specifically, the dual water passages are provided to the movable-side mirror plate 15, and a void is provided between these water passages.

Third Embodiment

Figure 12:
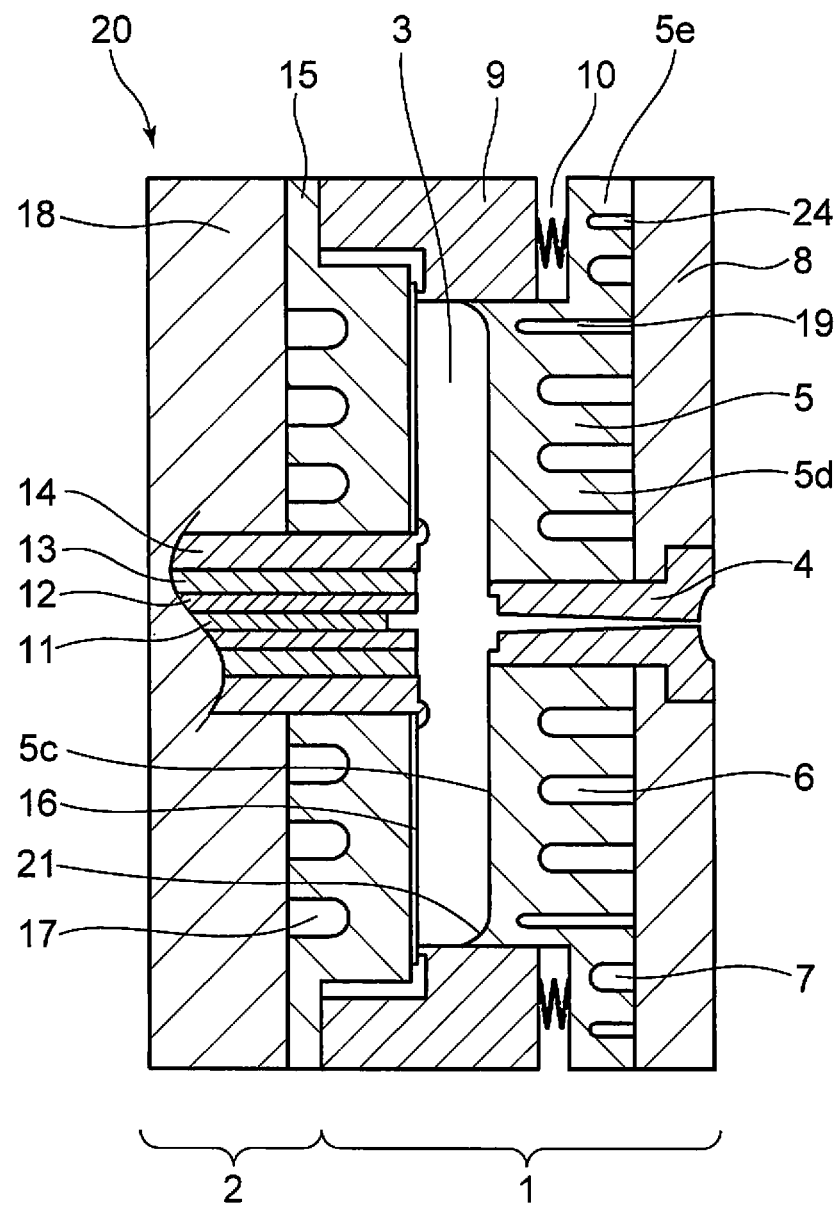
FIG. 12 is a cross section of the disk substrate die according to the third embodiment of the present invention.

FIG. 12 is a cross section of the disk substrate molding die 20 according to the third embodiment of the present invention.

The disk substrate molding die 20 of the third embodiment differs from the first embodiment in that the a void 24 is provided to the outer side of the water passage 7 of the fixed-side mirror plate 5. The void 24 functions to prevent the transfer of heat from the water passage 7 of the fixed-side mirror plate 5 toward the outward radial side. As a result of providing the void 24, it is possible to shorten the time that is required for the temperature of the fixed-side mirror plate 5 in the vicinity of the water passage 7 to become stable.

The distance between the void 24 and the surface on the side of the movable-side mirror plate in the fixed-side mirror plate 5 is preferably 1 to 5 mm.

With the disk substrate molding die 20 according to the third embodiment also, the thickness becomes narrow as it heads toward the outer circumferential end at the outer circumferential part of the cavity 3. Thus, with a disk substrate molded with the injection molding method, the increase in thickness is set off with the edge wedge of that outer circumferential part. Accordingly, the thickness of the disk substrate becomes constant from the inner circumference to the outer circumference. The surface processing of the movable-side mirror plate 15 can be performed with precision, and reproducibility can be maintained so as long as the die is not changed.

The embodiments can be summarized as follows.

(1) With the disk substrate molding apparatus of the foregoing embodiment, a protruding part is formed at an outer circumferential part on the molding surface of the second die, and the temperature of the protruding part is controlled to be higher temperature in comparison to the temperature of its inner circumferential region in a state where molten resin exists in the cavity. Thus, in a state before the molded piece removed from the molding die is cooled and solidified, the surface of the molded piece opposite to the protruding part of the second die is more concaved than its inner circumferential region. Meanwhile, the opposite surface is a shape that protrudes more than its inner circumferential region. Specifically, the molded piece prior to solidification is warped toward one side at the outer circumferential part. Nevertheless, the area (concave area) corresponding to the protruding part on the surface that is opposite to the stamper in the molded piece is of a higher temperature in comparison to the area further toward the inner circumferential side than the foregoing area. Thus, when the molded piece removed from the molding die is cooled and solidified, the outer circumferential part of the molded piece bends toward the non-stamper side (second die side) due to the bimetallic effect as the cooling progresses. Specifically, the warping of the molded piece is forced when it is cooled. Accordingly, it is possible to effectively inhibit the edge wedge where the outer circumferential part of the molded piece becomes thick.

(2) Preferably, the second die comprises an outer thermostatic water passage positioned in an area including the protruding part, an inner thermostatic water passage that is formed separately from the outer thermostatic water passage and which is positioned in an area including a region further toward the inner circumferential side than the protruding part, and a heat transfer preventing part which prevents heat transfer between the area including the protruding part and the area including a region further toward the inner circumferential side than the protruding part.

With this mode, the outer circumferential region corresponding to the protruding part is controlled to be a higher temperature in comparison to the region further toward the inner circumferential side than the outer circumferential region based on the temperature controlled water flowing through the outer thermostatic water passage and the temperature controlled water flowing through the inner thermostatic water passage. Thus, a temperature difference can be efficiently formed in the second die with the temperature controlled water. Accordingly, it is possible to efficiently form a temperature difference, in the molten resin existing in the cavity, between the temperature of the region opposite to the protruding part and the temperature of the region opposite to the region that is more inward than the protruding part.

(3) When the amount of protrusion of the protruding part is represented by y [μm], the radial distance from an outer circumferential end of the molding surface is represented by x [mm], and the radial width from the molding surface to an inner end part of the protruding part is represented by $x_0$ [mm], preferably, the shape of the protruding part satisfies the following Relational Expression (2):

$$y=6(x_0-x)^{2.5} \qquad (2).$$

With a molded piece that is molded with the molding apparatus of the foregoing mode, the edge wedge is effectively removed when the molded piece is cooled and solidified. It is thereby possible to obtain a disk substrate without any edge wedge.

(4) When the amount of protrusion of the protruding part is represented by y [μm], the radial distance from an outer circumferential end of the molding surface is represented by x [mm], the radial width from the molding surface to an inner end part of the protruding part is represented by $x_0$ [mm], and the disk substrate thickness is d [μm], preferably, the shape of the protruding part satisfies the following Relational Expression (3):

$$y=6(x_0-x)^{2.5} \times d/[d+6(x_0-x)^{2.5}] \qquad (3).$$

With a molded piece that is molded with the molding apparatus of the foregoing mode, the edge wedge is effectively removed when the molded piece is cooled and solidified. It is thereby possible to obtain a disk substrate without any edge wedge.

(5) Preferably, the heat transfer preventing part includes a void formed between the area including the protruding part and the area including a region further toward the inner circumferential side than the protruding part.

With this mode, a temperature difference can be formed in the second die with a simple configuration.

(6) Preferably, the distance between the molding surface and the void is 1 mm or more and 2 mm or less.

With this mode, the heat transfer can be effectively prevented while obtaining the strength for maintaining the surface shape of the mirror member.

(7) Preferably, the second die comprises a mirror member including the molding surface, and an annular outer circumferential member which is formed separately from the mirror member, and, in the foregoing case, preferably, the outer circumferential member is provided concentrically with the mirror member, and defines an outer circumferential surface of the disk-shaped cavity.

With this mode, the heat transfer can be reduced between the outer circumferential member forming an outer circumferential surface shape of the molded piece and the mirror member forming a region on the inner circumferential side of the molded piece.

(8) The disk substrate molding embodiment of the foregoing embodiment is a method of molding a disk substrate using a disk substrate molding die having a stamper, a first die including a mirror member to which the stamper comes in contact, and a second die including a molding surface which forms a disk-shaped cavity between the molding surface and the stamper, wherein the second die includes a protruding part which protrudes toward the stamper at an outer circumferential part of the molding surface, and wherein temperature of the second die is controlled so that the protruding part exhibits a higher temperature in comparison to a region further toward the inner circumferential side than the protruding part, and temperature of the first die is controlled so that a region opposite to the protruding part exhibits a lower temperature in comparison to the protruding part in the mirror member.

(9) In the foregoing disk substrate molding method, if the second die comprises an outer thermostatic water passage positioned in an area including the protruding part, and an inner thermostatic water passage that is formed separately from the outer thermostatic water passage and which is positioned in an area including a region further toward the inner circumferential side than the protruding part, preferably, the temperature of the second die is controlled so that the protruding part exhibits a higher temperature in comparison to a region further toward the inner circumferential side than the protruding part by causing the temperature of the outer thermostatic water passage to be higher than the temperature of the inner thermostatic water passage.

(10) In the foregoing disk substrate molding method, preferably, a molded piece removed from the disk substrate molding die is forced to warp from a position corresponding to an inner end part of the protruding part as cooling progresses.

(11) The disk substrate molding die of the foregoing embodiment is a disk substrate molding die for use in the disk substrate molding apparatus, comprising a stamper, a first die including a mirror member to which the stamper comes in contact, and a second die including a molding surface which forms a disk-shaped cavity between the molding surface and the stamper, wherein the second die comprises a protruding part which protrudes toward the stamper at an outer circumferential part of the molding surface, an outer thermostatic water passage positioned in an area including the protruding part, an inner thermostatic water passage that is formed separately from the outer thermostatic water passage and which is positioned in an area including a region further toward the inner circumferential side than the protruding part, and a heat transfer preventing part which prevents heat transfer between the area including the protruding part and the area including a region further toward the inner circumferential side than the protruding part.

(12) With the foregoing disk substrate molding die, when the amount of protrusion of the protruding part is represented by y [μn], the radial distance from an outer circumferential end of the molding surface is x [mm], and the radial width from the molding surface to an inner end part of the protruding part is represented by $x_0$ [mm], preferably, the shape of the protruding part satisfies the following Relational Expression (2):

$$y=6(x_0-x)^{2.5} \qquad (2).$$

(13) With the foregoing disk substrate molding die, when the amount of protrusion of the protruding part is represented by y [μm], the radial distance from an outer circumferential end of the molding surface is represented by x [mm], the radial width from the molding surface to an inner end part of the protruding part is $x_0$ [mm], and the disk substrate thickness is represented by d [μm], preferably, the shape of the protruding part satisfies the following Relation Expression (3):

$$y=6(x_0-x)^{2.5} \times d/[d+6(x_0-x)^{2.5}] \qquad (3).$$

(14) With the foregoing disk substrate molding die, the heat transfer preventing part includes a void formed between the area including the protruding part and the area including a region further toward the inner circumferential side than the protruding part.

(15) With the foregoing disk substrate molding die, preferably, the second die comprises a mirror member including the molding surface, and an annular outer circumferential member which is formed separately from the mirror member, and the outer circumferential member is provided concentrically with the mirror member, and defines an outer circumferential surface of the disk-shaped cavity.

The method of manufacturing the disk substrate die and disk substrate of the present invention is effective upon manufacturing a flat resin substrate with a uniform thickness such as an optical recording medium or a magnetic recording medium.

DESCRIPTION OF REFERENCE NUMERALS 1 fixed-side die
2 movable-side die
3 cavity
4 sprue bush
5 fixed-side mirror plate
5a inner member
5b outer member
5c molding surface
5d molding part
5e outer supporting part
6, 7, 17 water passage
8 fixed-side plate
9 outer circumferential ring
10 spring
11 ejector pin
12 cut punch
13 ejector
14 stamper holder
15 movable-side mirror plate
16 stamper
18 movable-side plate
19 void
20 molding die
21 protruding part
23 fitting part
24 void
25 temperature controller
25a first supplying part
25b second supplying part
25c third supplying part
30 molding system
32 molding apparatus
33 material supplying device
34 injection machine
35 mold clamping machine
36 hopper
37 heating cylinder

The invention claimed is:

1. A disk substrate molding apparatus, comprising:
a disk substrate molding die; and
a temperature controller including a first supplying part, a second supplying part and a third supplying part, wherein
the disk substrate molding die includes:
a stamper;
a first die including a mirror member disposed in contact with the stamper; and
a second die including a molding surface which forms a disk-shaped cavity between the molding surface and the stamper,
the second die includes a protruding part which protrudes in a direction toward the stamper at an outer circumferential part of the molding surface,
the second die including: 1) an outer thermostatic water passage positioned in an area that includes the protruding part and that is supplied water from the third supplying part of the temperature controller; and 2) an inner thermostatic water passage which is formed separately from the outer thermostatic water passage and which is positioned in an area that includes a region that is further toward an inner circumferential side of the disk substrate molding die than the protruding part and that is supplied water from the second supplying part of the temperature controller,
the first die includes a thermostatic water passage that is supplied water from the first supplying part of the temperature controller, and
the temperature controller controls temperature of the second die by controlling temperature of the water supplied from the second and third supplying parts to the inner thermostatic water passage and the outer thermostatic water passage so that the protruding part exhibits a higher temperature in comparison to a region further toward the inner circumferential side of the disk substrate molding die than the protruding part, and controls temperature of the first die by controlling temperature of water supplied from the first supply part to the thermostatic water passage so that a region in the mirror member opposite to the protruding part exhibits a lower temperature in comparison to the protruding part.

2. The disk substrate molding apparatus according to claim 1, wherein
the second die comprises a heat transfer preventing part, located between the outer thermostatic water passage and the inner thermostatic water passage, which prevents heat transfer between the area including the protruding part and the area including a region further toward the inner circumferential side of the disk substrate molding die than the protruding part.

3. The disk substrate molding apparatus according to claim 1, wherein
when the amount of protrusion of the protruding part is represented by y [μm], the radial distance from an outer circumferential end of the molding surface is represented by x [mm], and the radial width from the molding surface to an inner end part of the protruding part is represented by $x_0$ [mm], the shape of the protruding part satisfying the following Relational Expression (2):

$$y=6(x_0-x)^{2.5} \qquad (2).$$

4. The disk substrate molding apparatus according to claim 1, wherein
when the amount of protrusion of the protruding part is represented by y [μm], the radial distance from an outer circumferential end of the molding surface is represented by x [mm], the radial width from the molding surface to an inner end part of the protruding part is represented by $x_0$ [mm], and the disk substrate thickness is represented by d [μm], the shape of the protruding part satisfies satisfying the following Relational Expression (3):

$$y=6(x_0-x)^{2.5} \times d/[d+6(x_0-x)^{2.5}] \qquad (3).$$

5. The disk substrate molding apparatus according to claim 2, wherein the heat transfer preventing part includes a void formed between the area including the protruding part and the area including a region further toward the inner circumferential side of the disk substrate molding die than the protruding part.

6. The disk substrate molding apparatus according to claim 5, wherein the distance between the molding surface and the void is in a range from 1 mm to 2 mm.

7. The disk substrate molding apparatus according to claim 1, wherein the second die comprises a mirror member including the molding surface, and an annular outer circumferential member which is formed separately from the mirror member, and the outer circumferential member is provided concentrically with the mirror member, and defines an outer circumferential surface of the disk-shaped cavity.

* * * * *